(12) United States Patent
Barker et al.

(10) Patent No.: US 10,001,379 B2
(45) Date of Patent: Jun. 19, 2018

(54) ITINERARY GENERATION AND ADJUSTMENT SYSTEM

(71) Applicant: INRIX Inc., Kirkland, WA (US)

(72) Inventors: Alec Barker, Woodinbille, WA (US); Cory Bradshaw, Kirkland, WA (US)

(73) Assignee: INRIX INC., Kirkland, WA (US)

( * ) Notice: Subject to any disclaimer, the term of this patent is extended or adjusted under 35 U.S.C. 154(b) by 125 days.

(21) Appl. No.: 14/842,120

(22) Filed: Sep. 1, 2015

(65) Prior Publication Data

US 2017/0059337 A1    Mar. 2, 2017

(51) Int. Cl.
| | |
|---|---|
| *G05D 1/00* | (2006.01) |
| *G01C 21/34* | (2006.01) |
| *G06F 17/30* | (2006.01) |
| *G01C 21/36* | (2006.01) |
| *G06Q 10/00* | (2012.01) |

(52) U.S. Cl.
CPC ....... *G01C 21/343* (2013.01); *G01C 21/3415* (2013.01); *G01C 21/362* (2013.01); *G01C 21/3697* (2013.01); *G06F 17/30241* (2013.01); *G06F 17/30345* (2013.01); *G06F 17/30876* (2013.01); *G06Q 10/00* (2013.01)

(58) Field of Classification Search
CPC .............. G01C 21/343; G01C 21/3415; G01C 21/362; G01C 21/3697; G06F 17/30241
See application file for complete search history.

(56) References Cited

U.S. PATENT DOCUMENTS

| | | | | |
|---|---|---|---|---|
| 7,783,296 B2 * | 8/2010 | Kaplan | ................. | G08G 1/0104 340/988 |
| 9,200,918 B2 * | 12/2015 | Chelotti | ............. | G01C 21/3617 |
| 2005/0228677 A1 * | 10/2005 | McCabe | ................. | G06Q 10/02 705/5 |
| 2005/0251324 A1 * | 11/2005 | Wiener | .................. | G01C 21/32 701/414 |
| 2010/0211425 A1 * | 8/2010 | Govindarajan | ........ | G01C 21/34 705/7.16 |
| 2011/0087426 A1 * | 4/2011 | Feng | .................... | G01C 21/343 701/532 |

(Continued)

OTHER PUBLICATIONS

Int. Search Report/Written Opinion cited in PCT Application No. PCT/US2016/049559 dated Nov. 9, 2016, 11 pgs.

*Primary Examiner* — Ian Jen
(74) *Attorney, Agent, or Firm* — Cooper Legal Group, LLC

(57) ABSTRACT

One or more techniques and/or systems are provided for routing a user between events using an itinerary. An event source (e.g., electronic calendar) may be assessed to identify event information (e.g., event locations) for events (e.g., meetings). The event information may be evaluated to determine a schedule of events. Routes between events within the schedule may be identified to determine route information (e.g., predicted travel times) for the routes. The event information and the route information may be evaluated to generate an itinerary of events. In an example, a constraint may be identified (e.g., a traffic accident along a route). The constraint may be evaluated to determine an impact (e.g., a user arriving to the meeting event late) of the constraint on the itinerary. Responsive to the impact exceeding an adjustment threshold, the itinerary may be adjusted (e.g., modifying a route between one or more events to avoid the accident).

20 Claims, 11 Drawing Sheets

(56) References Cited

U.S. PATENT DOCUMENTS

| | | | | |
|---|---|---|---|---|
| 2011/0113148 A1* | 5/2011 | Salmela | G01C 21/3438 | 709/229 |
| 2012/0010805 A1* | 1/2012 | Wilkerson | G06Q 10/109 | 701/538 |
| 2012/0245847 A1* | 9/2012 | Cheng | G06Q 10/10 | 701/527 |
| 2013/0345961 A1 | 12/2013 | Leader et al. | | |
| 2014/0278032 A1* | 9/2014 | Scofield | G01C 21/3492 | 701/118 |
| 2014/0358435 A1* | 12/2014 | Bell | G01C 21/3492 | 701/527 |
| 2015/0006666 A1* | 1/2015 | Backholm | H04W 4/18 | 709/213 |
| 2015/0073687 A1* | 3/2015 | Hampapur | G08G 1/07 | 701/117 |

* cited by examiner

ITINERARY GENERATION AND ADJUSTMENT SYSTEM

BACKGROUND

Today, users (e.g., commuters) face a daunting task managing full schedules of events (e.g., appointments, meetings, etc.) often at multiple event locations. For example, in a single day, a parent may need to drop a child off at school, stop for gas, arrive at work in time for a morning meeting, leave work for a dental appointment in the afternoon, possibly return to work if there is time, and make it back to pick the child up from school. However, managing such full schedules of events may provide a challenge for many scheduling systems. For example, scheduling systems often do not account for travel times between destinations and/or may not account for traffic conditions along routes between destinations. Thus, users may end up running late for events and/or missing events all together. Moreover, many scheduling systems are limited by the information available to them. For example, user may often neglect entering regularly scheduled events (e.g., book club meetings occurring every Tuesday during the winter) and/or habitual events (e.g., going to the park to run every Monday and Friday during lunch). Unfortunately, many scheduling systems may lack technology that can provide users with a clear picture of what their schedules look like and/or that can adapt to constraints encountered by the user throughout the course of the day.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for routing a user between events using an itinerary are provided. In an example, an event source (e.g., electronic calendar, a voicemail inbox, a social network profile, a blog, a purchase history, etc.) may be assessed to identify event information (e.g., event start times, event end times, event locations, etc.) for events associated with a user. In an example, a recognition analysis model may be utilized to identify event information for the first event (e.g., an image recognition analysis model, a voice recognition analysis model, etc.). The event information may be evaluated to determine a schedule of events (e.g., an order of events). In an example, a plurality of potential schedules may be identified. Routes between events within the schedule of events may be identified to determine route information for the routes (e.g., route distances, predicted travel time, traffic information, etc.). The event information for the events within the schedule of events and the route information for the routes may be evaluated to generate an itinerary of events.

In an example, a time window between the event end time for the first event and the event start time for the second event may be identified (e.g., the time window may be indicative of how much time the user has to get from the first event location to the second event location). Responsive to identifying the time window between the first event and the second event, predicted travel times may be determined for routes (e.g., potential routes) between the first event and the second event within the schedule of events. The predicted travel times and the time window may be evaluated to determine whether to include at least one of the first event or the second event in the itinerary. In another example, responsive to the predicted travel time for a first route not exceeding the time window, the first route may be utilized as the route between the first event and the second event.

In an example, a constraint (e.g., a time constraint due to traffic moving slower than predicted) on the itinerary may be identified. The constraint may be evaluated to determine an impact (e.g., a user arriving to a meeting event late, a vehicle consuming more gas than planned due to being stuck in traffic for an extended period of time, etc.) of the constraint on the itinerary. Responsive to the impact exceeding an adjustment threshold, the itinerary may be adjusted (e.g., to reduce the impact the constraint has on the itinerary). In an example, the itinerary may be adjusted by modifying a route between one or more events, modifying an order of events within the schedule of events, adding an event to the itinerary, and/or removing an event from the itinerary. In an example, responsive to adjusting the itinerary, a notification of the itinerary adjustment may be provided to at least one of the user or a second user associated with the event impacted by the constraint (e.g., a push notification, a text message notification, an email notification, a calendar update notification, etc.).

In an example, locational information (e.g., global positioning system (GPS) data, accelerometer data, gyroscope data, and/or other various locational data associated with a smart phone, a mobile device, a wearable device, a smart watch, smart glasses, a vehicle navigation unit, etc.) may be monitored to determine a current location of the user. The current location of the user may be compared to a predicted user location from the itinerary to determine a deviation distance (e.g., a distance that the user is either ahead and/or behind where the itinerary predicts the user should be at a given time). Responsive to the deviation distance exceeding a threshold deviation distance, identifying the deviation distance as being indicative of the constraint on the itinerary (e.g., the user being more than 10 miles behind where the itinerary predicts the user to be may be identified as a constraint on the itinerary). The user may be routed between events using the itinerary.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
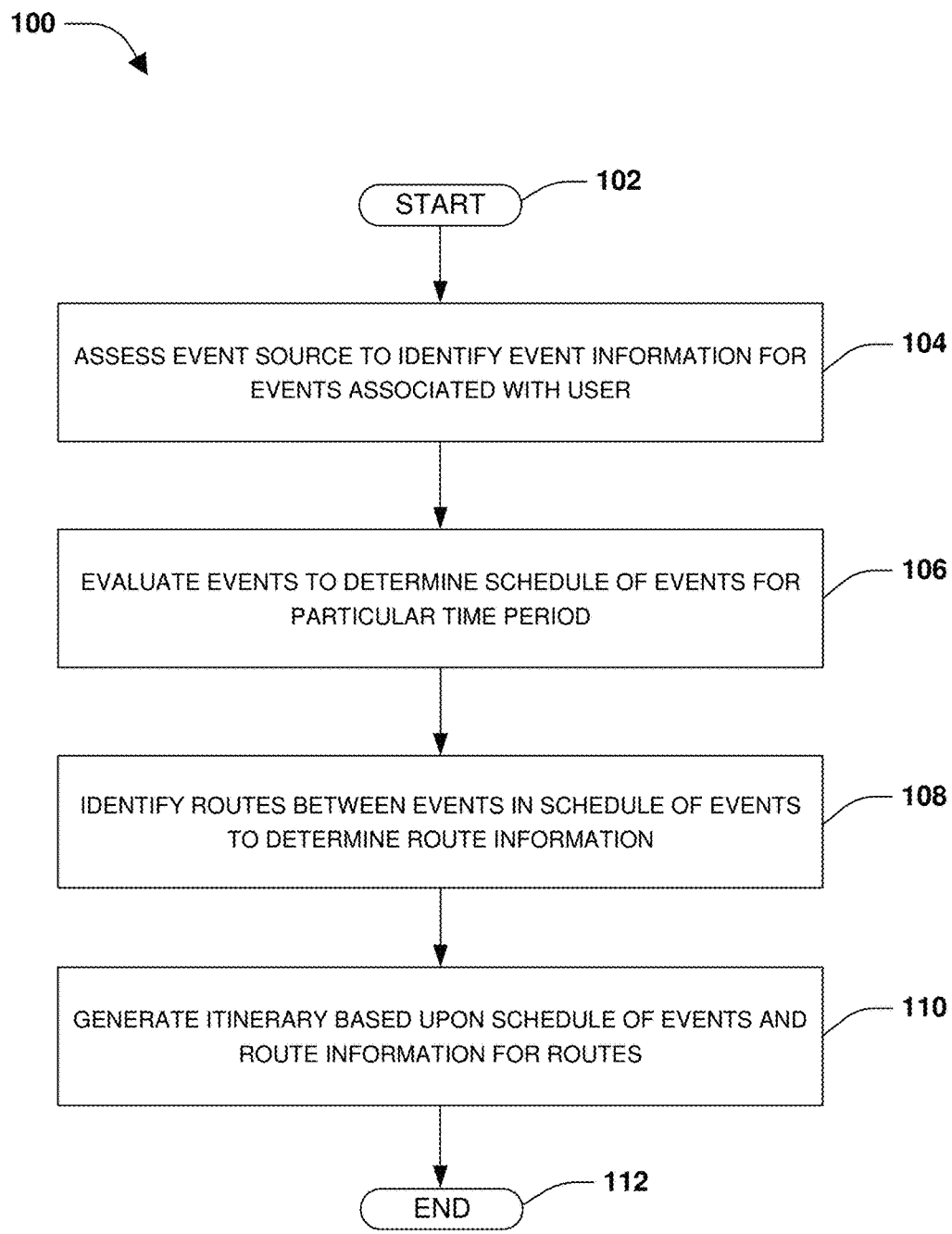
FIG. 1 is a flow diagram illustrating an exemplary method of generating an itinerary of events for a user.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for routing a user between events using an itinerary are provided. Many scheduling systems may lack, among other things, an ability to accurately plan out a schedule of events for a user. In this regard, many scheduling systems are limited by the means within which information may be obtained (e.g., many scheduling systems are limited to information directly inputted into the scheduling system by the user). Accordingly, relevant events for a given time period may be excluded due to the events being contained in various databases having varying degrees of accessibility (e.g. event information for a first event the user needs to attend on a Tuesday may be maintained in an event calendar but a second event that the user needs to attend on the Tuesday may be maintained in an email database). Moreover, many scheduling systems lack the ability to make adjustments to schedules based upon constraints that occur during the course of a day (e.g., scheduling systems may not be able to make adjustments based upon a user getting a flat tire and/or an increase in traffic volume along a route). As provided herein, an itinerary of events may be generated to correspond to a particular time period (e.g., a day, a weekend, a span of a family vacation, etc.). The events may be identified by assessing event sources (e.g., digital calendars, social media posts, learned event databases, etc.) associated with the user. In this way, the itinerary may comprise events that the user has provided (e.g., such as by entering event information into a calendar and/or accepting an event invitation on a social media website), as well as learned events (e.g., going to soccer practice every Wednesday at 7 pm) identified based upon historical data associated with the user. A plurality of potential schedules (e.g., order of events) may be generated for a set of events associated with a particular time period based upon event information for the events. Potential routes between the events within the plurality of potential schedules may be identified to determine route information for the potential routes. The event information for the potential schedules and the route information for the potential routes may be evaluated to determine an efficient itinerary for the user. The movements of the user as the user progresses through the day may be monitored to identify constraints (e.g., a traffic accident along a route that the user is traveling upon, a flat tire on a vehicle that the user is within, etc.) on the itinerary. Responsive to identifying the constraint on the itinerary, the itinerary may be adjusted to remove and/or minimize the impact of the constraint on the itinerary. In this way, the itinerary may more efficiently plan out the user's day and/or include more relevant events within the itinerary for the user. The itinerary may also be adjusted to assist the user in navigating constraints that may be encountered over a given time period and/or maximize the efficiency of the user during the given time period (e.g., alternate route may be provided to the user as a result of a traffic accident constraint, a workout event may be added to the itinerary based upon a meeting cancelation constraint being identified, etc.).

An embodiment of generating an itinerary for a user is illustrated by an exemplary method 100 of FIG. 1. At 102, the method 100 starts. At 104, an event source may be assessed to identify event information for events associated with a user. In an example, the event source may comprise content items (e.g., emails, social networking post, calendar entries, voice messages, etc.) associated with events. In an example, the event source may comprise at least one of a digital calendar (e.g., a work calendar, a personal calendar, a social networking calendar, etc.), a learned behavior database (e.g., a database of events learned from behavior patterns of the user), a learned event library (e.g., a library of routes for frequently traveled to locations), a social network (e.g., a network of individuals, such as acquaintances, friends, family, colleagues, or co-workers, coupled via a communications network or via a variety of sub-networks, such as through a social networking website, a social photo sharing mobile application, etc.), an email interface, a message board, a blog, a messaging interface (e.g., a text message client, an instant messaging client, etc.), a vehicle maintenance system (e.g., a fuel monitoring system, an airbag deployment system, a tire pressure system, etc.), or an event scheduling application (e.g., a work scheduling client such as for assigning shifts to employees of a hospital, a restaurant reservation client such as for making dinner reservations, etc.). In an example, a plurality of event sources may be assessed to identify events associated with the user (e.g., a work calendar, a learned event database, and a social networking webpage may be assessed to identify events associated with the user).

The events may comprise meeting events (e.g., business meetings, volunteer meetings, personal meetings, etc.), social events (e.g., birthday parties, concerts, charity events, movie premiers, dinner dates, etc.), doctors' appointments, personal errands (e.g., stopping at the grocery store, picking a child up from school, etc.), workout sessions, vehicle maintenance events (e.g., stopping to get gas, getting an oil change, etc.), or the like. In an example, the events associated with a particular time period, such as a particular day, a particular time of day (e.g., work hours, morning hours, etc.), and/or a particular set of days (e.g., a weekend) may be grouped into a set of events for the particular time period.

In an example, the events may be reoccurring events (e.g., a birthday, a weekly book club that meets on Tuesday nights, etc.).

In an example, the content items associated with the events may be evaluated to identify event information for the events. The event information may comprise an event start time, an event end time, an event priority, an event flexibility (e.g., does the event have a start end time and/or can the event be start time be easily changed), an event guest list (e.g., meeting attendees), an event location (e.g., street addresses, global positioning coordinates, etc.), and/or the like. In an example, a machine-learning technique may be utilized to evaluate content items associated the events to identify the event information for the events (e.g., algorithms may be utilized to evaluate data, such as metadata from calendar entries, and make predictions regarding the data for identification and/or training purposes). For example, a recognition analysis model may be utilized to identify the events and/or the event information for the events (e.g., a recognition analysis model may evaluate a social media post on a webpage to identify a holiday party event and/or an event start time for the holiday party event). The recognition analysis model may comprise a textual recognition analysis model (e.g., optical character recognition may be utilized to evaluate text of a text message to determine an address for an event, metadata for a mapping webpage may be evaluated to determine the event location from a virtual pin drop on a map, etc.), an image recognition analysis model (e.g., facial recognition may be utilized to identify individuals associated with the event), a video recognition analysis model (e.g., a video message may be evaluated to determine an event time from an animated video advertising the event), an audio recognition analysis model (e.g., a voicemail message may be evaluated to identify an event start time for social outing event), and/or the like. In an example, the recognition analysis model may evaluate text of an event flyer attached to an email content item to determine an event start time specified in the text of the flyer. In another example, an image on the event flyer may be evaluated to determine the event location, such as by identifying a landmark like the Golden Gate Bridge. In this way, various types of content items (e.g., images, videos, voice recordings, etc.) may be evaluated to identify the event information contained therein regardless of the type (e.g., file format) of the content items. In an example, a first recognition analysis model maybe utilized to identify the event information for the first event from a first type of content (e.g., audio file) and a second recognition analysis model may be utilized to identify the event information for the second event from the second type of content (e.g., image file), wherein the first recognition analysis model is different than the second recognition analysis model.

In an example, additional event information may be determined based upon known event information. For example, a calendar entry for a business meeting event may be evaluated to identify a second individual attending the business meeting event. Responsive to identifying the second individual, a contact list (e.g., an address book, a web-based public directory, etc.) associated with the user may be assessed to identify contact information for the second individual, such as a work address and/or a home address. Responsive to the business meeting event having an event start time during work hours, the event location may be identified as the work address and not the home address of the second individual. In an example, the user may be prompted to confirm the event information identified for the event. For example, the event may be evaluated and a set of potential event locations, event start times, etc. may be provided to the user, such as through a notification sent to a mobile device of the user.

In an example, responsive to identifying event information for the events, the user may be prompted to confirm the event information for the events. For example, a notification (e.g., a popup notification) indicative of a potential event location for the first event may be display on the mobile device of the user. Responsive to the user confirming the potential event location, the potential event location may be utilized as the event location for the first event. In another example, responsive to the user not confirming the potential event location, the user may be prompted to manually enter the event location for the first event.

At 106, the events may be evaluated to determine a schedule of events for a particular time period. In an example, a plurality of schedules of events may be generated based upon the set of events for the particular time period (e.g., all possible orders of events that do not overlap with each other may be generated). For example, the event information for events associated with the particular time period (e.g., a Tuesday) may be evaluated to determine viable schedule of events. The schedule of events may be indicative of events that the user may attend within the particular time period based upon the event start times and the event end times (e.g., events that do not overlap with other events). In an example, an event end time for a first event and an event start time for a second event may be evaluated to determine a conflict between the first event and the second event (e.g., determine if the event times overlap). Responsive to determining that there is no conflict between the event times for the first event and the second event, the first event and the second event may be added to the schedule of events. In another example, responsive to determining a conflict between the event times for the first event and the second event, a first priority level for the first event and a second priority level for the second event may be identified and/or evaluated. Responsive to the first priority level for the first event being greater than the second priority level for the second event, the first event, but not the second event, may be included in the schedule of events (e.g., a doctor's appointment may have a higher priority level than running an errand and thus the doctor's appointment may be added to the schedule of events instead of the errand).

In another example, the first event and the second event may be evaluated to determine a flexibility factor. The flexibility factor may be indicative of an ability to adjust the event times and/or the event locations of the first event and/or the second event (e.g., a lunch break event may have a high flexibility factor based upon the user being able to eat his lunch in 20 minutes instead of 30 minutes). For example, a workout event may have a large flexibility factor based upon the event start time and/or the event end time for the workout event being very flexible (e.g., the user may work out later in the day and/or decrease a length of the of the workout, such as by shortening the workout from 60 minutes to 45 minutes). In this way, events with flexibility may be moved around within the schedule of events to allow the user to more efficiently utilize his time and/or attend more events throughout the period of time.

At 108, routes between the events in the schedule of events may be identified to determine route information for the routes. In an example, a set of potential routes between the first event location for the first event and the second event location for the second event may be identified. For example, a first potential route may utilize a highway, a second potential route may utilize surface streets, and a third potential route may utilize a combination thereof. The potential routes within the set of potential routes may be evaluated to determine route information for the potential routes. The route information may comprise route distances, transportation mode transitions (e.g., a user walking to a car, and proceeding to drive the car; the user walking to a bus stop, taking a first bus to a first location, and then taking a second bus to a second location; etc.), estimated travel times (e.g., time to walk to a car, drive the car along a particular route, park the car, and walk to a conference room within a building), route preferences (e.g., routes saved by the user between the first event location and the second event location, learned routes that the user frequently travels along, etc.), current traffic data (e.g., vehicle speed data may be collected from other users traveling along a portion of the route indicative of a current traffic level, location of current speed traps, etc.), historical traffic data (e.g., travel times from previous trips along routes, law enforcement data such as past speed-trap locations, red light camera locations, accident report data such as for areas know to have a high occurrence of accidents, etc.), construction data, weather data (e.g., predicted weather data along the routes, current weather data along the routes, etc.), and/or the like. The potential routes between the first event and the second event may be identified from saved routes and/or learned routes (e.g., the user may save a preferred route between a home of the user and a workplace of the user in a GPS component of a vehicle head unit, a learning component may analyze historical GPS data from a smartphone of the user to determine the route frequently taken by the user when traveling between the home of the user and the workplace of the user, etc.).

At 110, an itinerary may be generated based upon event information for the events within the schedule of events and route information for the routes between the events in the schedule of events. The itinerary may comprise events that the user is able to attend within a given time period (e.g., a set of non-conflicting events that the user may attend over the next few hours, a weekend, a span of a trip, etc.) as well as routes between the events (e.g., the itinerary may be indicative of not only where the user will be at a given time but also how the user will arrive there).

In an example, responsive to determining that the event end time for the first event does not overlap with the event start time for the second event, a time window between the event end time for the first event and the event start time for the second event may be identified (e.g., the time window may be indicative of how much time the user has to get from the first event location to the second event location). The user may adjust the time window by setting an early arrival parameter and/or an acceptable tardiness parameter for the time window (e.g., an amount of time the user prefers to arrive before events and/or an amount of time the user considers acceptable to arrive to events late). In this way, the itinerary may be customized based upon a preference of the user.

Responsive to identifying the time window between the first event and the second event, predicted travel times may be determined for the potential routes between the first event and the second event. The predicted travel times may be determined by evaluating at least one of route distances (e.g., the distance between the first event location and the second event location for a given route), route speed limits, vehicle types (e.g., a car, a bicycle, a bus, etc.), vehicle conditions (e.g., does the vehicle have enough gas to travel the route, is the vehicle towing a trailer, is the vehicle consuming more gas because the user is running the air conditioner, etc.), road restrictions (e.g., certain vehicles, such as semi-trucks, may not be permitted on certain roads), weather conditions (e.g., traffic may move slower on rainy days than it does on sunny days), current traffic data (e.g., real time traffic data, such as from other users currently traveling on routes or traffic cameras along the routes), historical trip data (e.g., trip times from trips previously traveled by the user), and/or historical traffic data (e.g., accident report data, traffic volume data, etc.). In an example, responsive to the predicted travel time for a first potential route exceeding the time window, the first potential route may not be utilized as the route between the first event location and the second event location. In another example, responsive to the predicted travel time for the first potential route not exceeding the time window, the first potential route may be utilized as the route between the first event location and the second event location.

In an example, responsive to the predicted travel times for all of the potential routes exceeding the time window, at least one of the first event or the second event may not be included in the itinerary (e.g., if no route will allow the user to arrive at the second event on time then one of the events may be removed from the itinerary), and the user may be notified of such, for example. In an example, responsive to determining not to include at least one of the first event or the second event in the itinerary, a first event priority for the first event and a second event priority for the second event may be evaluated to determine which of the first event or the second event not to include in the itinerary. In another example, responsive to the predicted travel time for the potential routes exceeding the time window, the event time (e.g., the event start time and/or the event end time) for at least one of the first event or the second event may be adjusted (e.g., the end time of the first event may be moved back 15 minutes to make the time window 15 minutes larger than before to allow for greater travel time between events). For example, the flexibility factor for the first event and the second event may be evaluated to determine the flexibility of the event times of the events.

In an example, responsive to identifying the plurality of schedules of events and/or a plurality of potential routes between events, a plurality of potential itinerary permutations may be evaluated to determine itinerary weights associated with the plurality of potential itinerary permutations. The itinerary weights may be determined based upon a likelihood of the user arriving at all events on time, the number of events included in the itinerary, the number of routes that travel along preferred routes, the event priorities, route preferences (e.g., a preferred route and/or a preferred type of route, such as a route traveling along a body of water or on a freeway, etc.) Responsive to a first itinerary weight for a first potential itinerary permutation being greater than a second itinerary weight for a second potential itinerary permutation, the first potential itinerary permutation may be presented to the user as the itinerary. In another example, the first potential itinerary permutation and the second potential itinerary permutation may be provided to the user. The user may provide feedback regarding at least one of the first potential itinerary permutation or the second potential itinerary permutation. For example, the feedback may be indicative of a user preference for the first potential itinerary permutation and not the second potential itinerary permutation.

In an example, the itinerary and/or itinerary notification (e.g., warnings about upcoming events and/or departure times) may be transmitted to a client device associated with the user. The client device may comprise the mobile device (e.g., a smartphone, a smartwatch, a tablet, etc.), a vehicle-head unit (e.g., dashboard interface), and/or any other device configured to run a web browser (e.g., a desktop computer, a laptop computer, etc.). In an example, reminder notification may be provided to the user for assisting the user in complying with the itinerary (e.g., a reminder notification notifying the user that he needs to depart for baseball game event in 10 minutes may be sent to the smartphone of the user). In this way, the user may increase the likelihood of attending all and/or most of the event within the itinerary, which may increase the efficiency of the user by increasing the amount of tasks the user may accomplish during the day.

In an example, the itinerary may be adjusted based upon constraints on the itinerary (e.g., an accident along a route, an event being canceled, a meeting running longer than planned, etc.). In an example, the itinerary may be adjusted by modifying the route between events, modifying the order of events impacted (e.g., changing the order of events in the schedule of events), adding events to the itinerary (e.g., responsive to an event being canceled, a new event may be added to the itinerary), and/or removing events from the itinerary. For example, responsive to an increase in the traffic level along the route to the second event location, a departure time from the first event location may be adjusted (e.g., the user may need to leave the first event location 10 minutes earlier than initially indicated by the itinerary based upon a traffic accident causing an increase in the traffic level along the route to the second event location).

In an example, the learned event database may comprise learned events, learned event locations, and/or learned routes identified from locational information indicative of a location and/or a route traveled by the user being above a travel frequency threshold. For example, the first route may be determined as a learned route (e.g., a preferred route) based upon an occurrence of the route between the first event location (e.g., work) and the second event location (e.g., the soccer field) exceeding a travel frequency threshold indicative of the user routinely and/or frequently taking the route to travel between the first event location and the second event location. A set of conditional likelihoods, indicative of the user traveling to an event, may be determined based upon the learned routes. In an example, the conditional likelihood may be computed by counting how often a result occurs given that a condition applies (e.g., a count of how often the user drives to a coffee shop given a current day of the week as Monday morning). The conditional likelihood may be determined as a probability that the user will travel to an event location given an occurrence of one or more route independent conditions, such as a time of day condition, a day of week condition, a weather condition, etc. Responsive to the conditional likelihood occurring, the learned event may be identified as an event associated with the particular time period and thus may be considered for inclusion in the itinerary. In this way, the user may be routed between events using the itinerary. At 112, the method 100 ends.

Figure 2A:
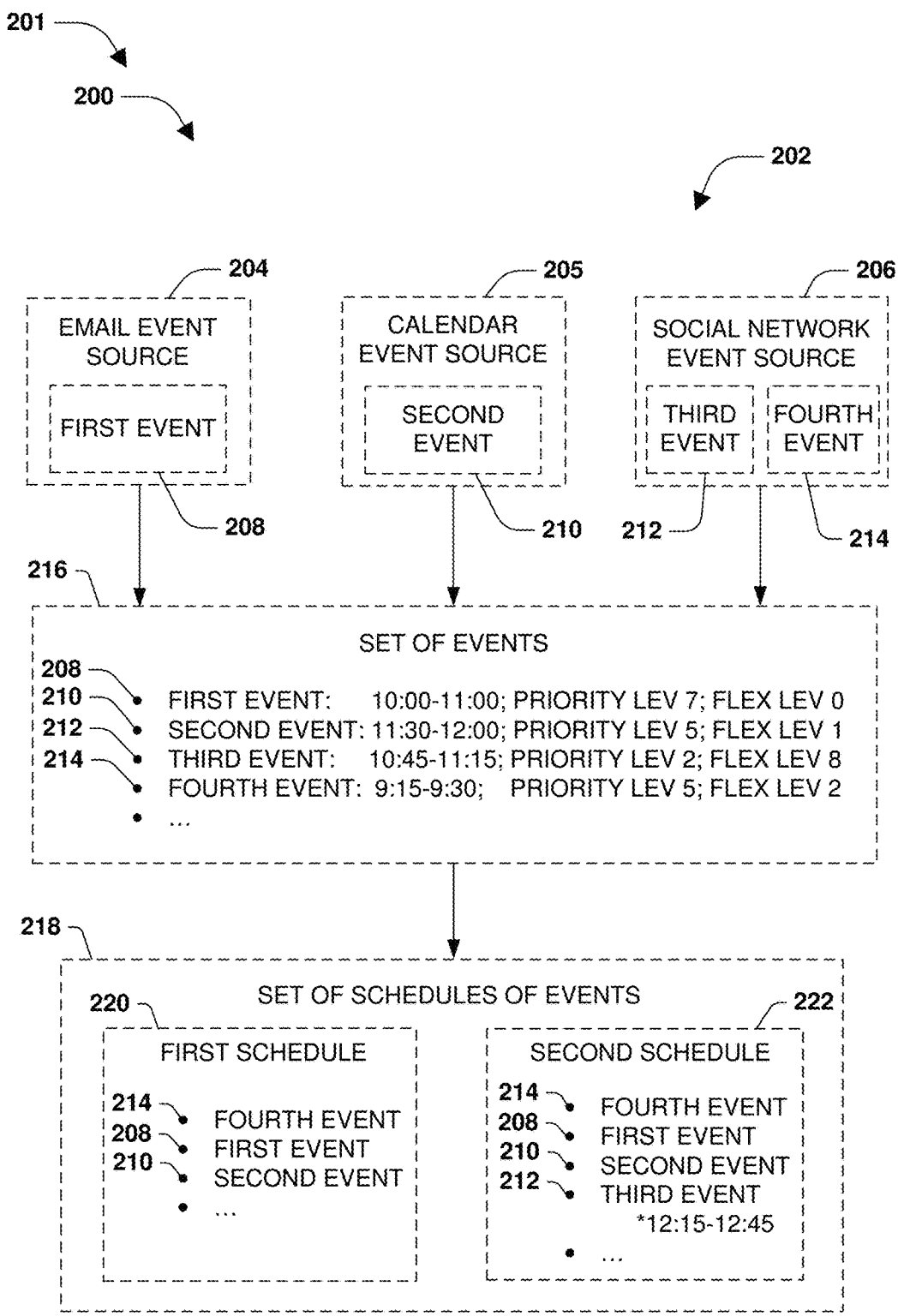
FIG. 2A is a component block diagram illustrating an exemplary system for generating an itinerary of events for a user, where a schedule of events is generated from a set of events.
Figure 2B:
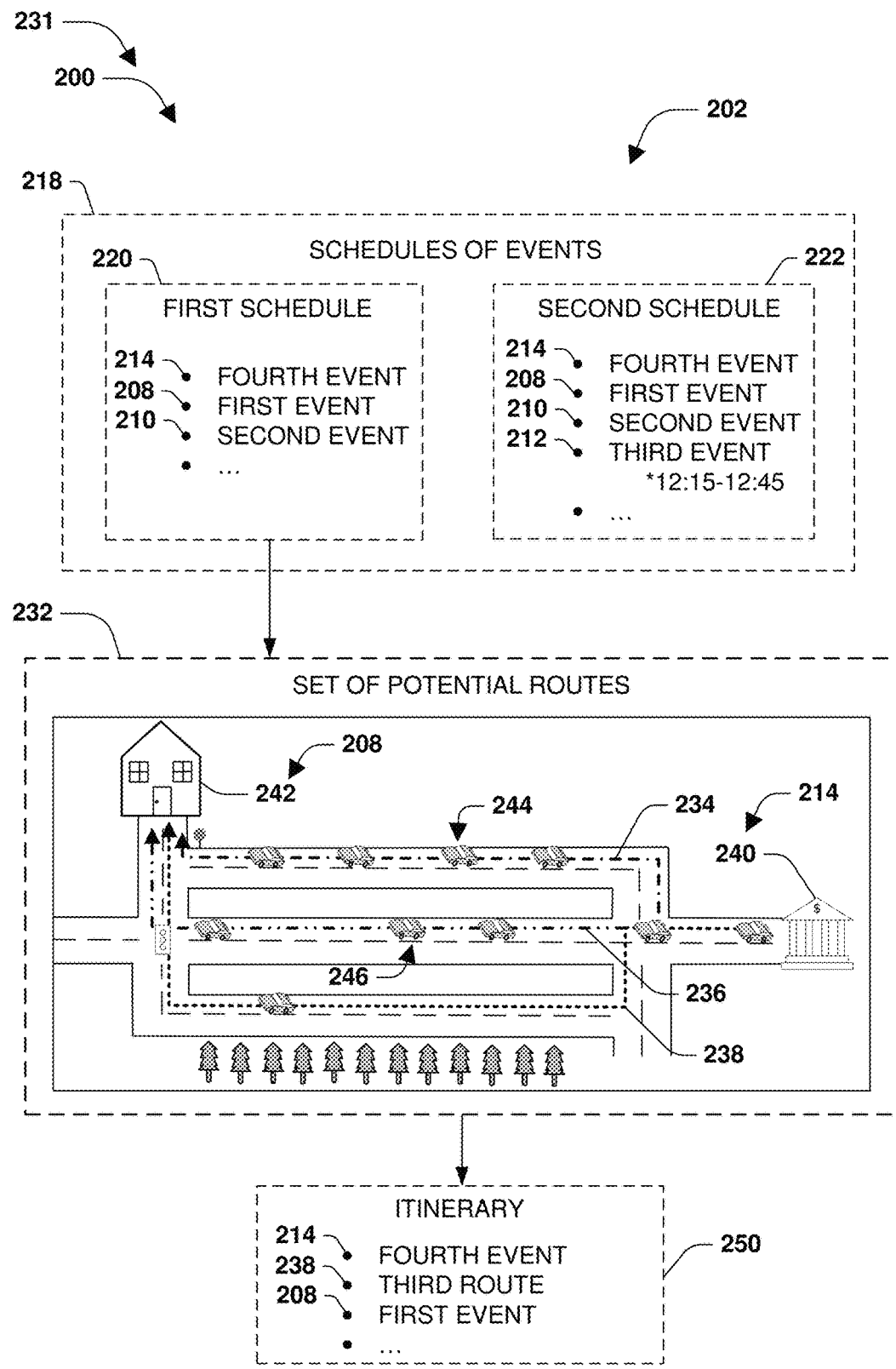
FIG. 2B is a component block diagram illustrating an exemplary system for generating an itinerary of events for a user, where a schedule of events and a set of potential routes are evaluated to generate the itinerary.

FIGS. 2A-2B illustrate examples of a system 200, comprising an itinerary generation component 202. FIG. 2A illustrates an example 201 of system 200, wherein the itinerary generation component 202 is identifying a set of schedules of events 218 from a set of events 216. In an example, the itinerary generation component 202 may assess a plurality of events sources, such as an email event source 204, a calendar event source 205, and/or a social network event source 206 to identify the set of events 216 associated with a particular day of a week. The itinerary generation component 202 may evaluate events 208-214 to determine event information for the events 208-214. The itinerary generation component 202 may evaluate the set of events 216 to determine a plurality of schedule iterations, such as a first schedule 220 and a second schedule 222. In an example, the first schedule 220 may comprise the forth event 214, the first event 208, and then the second event 210 in that order. The third event 212 may not be included in the first schedule 220 based upon a time conflict between the first event 208 and the third event 212. Responsive to identifying the time conflict between the first event 208 and the third event 212, priority levels for the first event 208 and the third event 212 may be determined. Responsive to the priority level for the first event 208 being greater than the priority level for the third event 212, the first event 208 but not the third event 212, may be included in the first event schedule 220.

The second schedule 222 may comprise the forth event 214, the first event 208, the second event 210, and then the third event 212. In an example, responsive to identifying the time conflict between the first event 208 and the third event 212 a flexibility level for the events 208-214 in the set of events 216 may be evaluated. Responsive to the third event 212 having a high flexibility level (e.g., such as an 8 on a scale of 0-10, wherein 0 is indicative of no flexibility and 10 is indicative of completely flexible), the event start time for the third event 212 may be modified from 10:45 to 12:15.

FIG. 2B illustrates an example 231 of system 200, wherein the itinerary generation component 202 is identifying a set of potential routes 232 for generating the itinerary 250. In an example, the itinerary generation component 202 may identify, among others, routes between the fourth event 214 and the first event 208 of the first schedule 220. For example, a first potential route 234, a second potential route 236, and a third potential route 238 may be identified between a first event location 240 for the fourth event 214 and a second event location 242 for the first event 208. In an example, route information for the routes 234-238 may be identified to determine route weights for the routes 234-238. Responsive to identify traffic jams 244 and 246 for the first route 234 and the second route 236, the first route 234 and the second route 236 may be determined to have lower route weights (e.g., less favorable) than the third route 238. Responsive to identifying a higher route weight for the third route 238, the third route 238 may be included in the itinerary 250 as the route utilized for traveling from the fourth event 214 to the first event 208.

Figure 3:
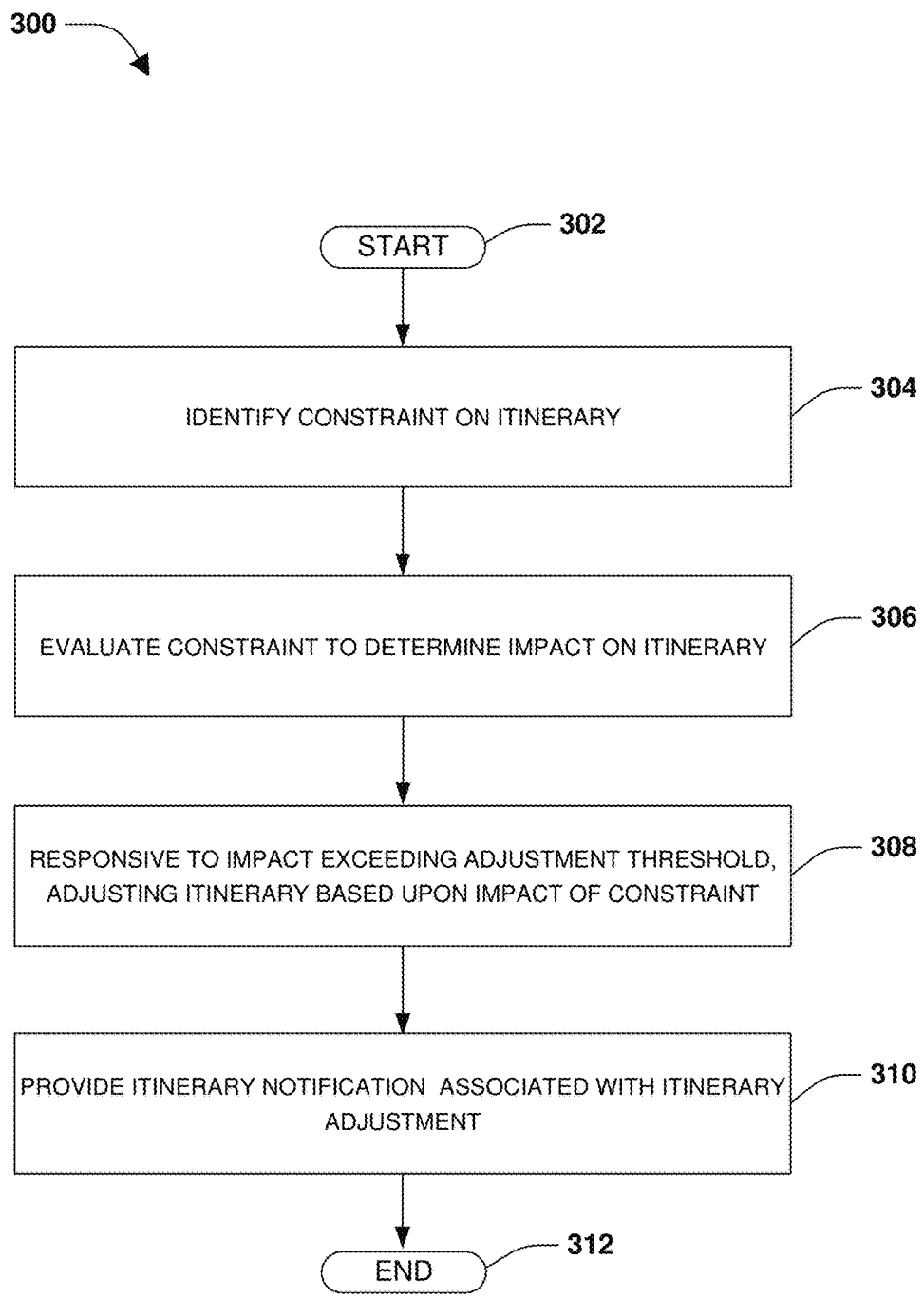
FIG. 3 is a flow diagram illustrating an exemplary method of adjusting an itinerary of events based upon a constraint on the itinerary.

An embodiment of adjusting an itinerary based upon a constraint on the itinerary is illustrated by an exemplary method 300 of FIG. 3. At 302, the method 300 starts. At 304, a constraint on an itinerary of a user is identified. The constraint may comprise a time constraint (e.g., a meeting running longer than planned), a traffic constraint (e.g., an increased amount of traffic along a particular route, an accident along the particular route, a road closure, etc.), a weather constraint (e.g., unexpected snow fall along the route), an emergency constraint (e.g., user needing to go to the hospital), a vehicle constraint (e.g., a maintenance constraint, such as a tire going flat, a fuel level being low, etc.), a user constraint (e.g., the user needs to stop and get food, the user needs to stop and sleep, the user needs medication, the user needing to use a restroom, etc.), and/or the like. In an example, the constraint may prevent the user from complying with the itinerary. For example, the constraint may prevent the user from traveling from a first event location for a first event to a second event location for a second event within a time window between the events (e.g., a traffic level along a route between the first event and the second event may be greater than normal due to unforeseen weather conditions).

In an example, the constraint may be identified based upon vehicle status information, route information, event information, and/or locational information (e.g., route information and traffic information corresponding thereto may be evaluated to determine a probability of the user arriving to a work-meeting event on time based upon the current location of the user). By way of example, a progression (e.g., a locational progression) of the user relative to the itinerary may be monitored, such as in real-time and/or relatively real-time by a mobile device communicating with a cloud based server. Responsive to the progression of the user not corresponding to the itinerary (e.g., the user not being on schedule), a first constraint on the itinerary may be identified. For example, the locational information associated with the user may be evaluated to determine the current location of the user. The current location of the user may be compared to a predicted user location (e.g., a predicted progression) associated with the itinerary to determine a deviation distance (e.g., the actual location of the user may be compared to an expected location of the user to determine how far the user is ahead of schedule and/or behind schedule). Responsive to the deviation distance exceeding a threshold deviation distance amount, the deviation distance may be identified as being indicative of the constraint on the itinerary.

In another example, vehicle status information may be utilized to identify the constraint. For example, vehicle status information for a vehicle associated with the user (e.g., a car the user is traveling in) may be monitored to determine a current vehicle status (e.g., a vehicle speed parameter may be determined from GPS data and/or onboard vehicle speed data from a vehicle speed control module of the vehicle). The current vehicle status may be compared to a predicted vehicle status to determine a deviation level (e.g., the vehicle speed parameter, such as an average speed of the vehicle may be compared to a predicted vehicle speed for all and/or portions of the route to determine how many miles the user is behind schedule). Responsive to the deviation level exceeding a threshold deviation level, the deviation level may be identified as being indicative of the constraint on the itinerary (e.g., a speed constraint may be identified based upon the vehicle speed not being sufficient to allow the user to reach the second event location within the time window, a fuel level constraint may identified based upon the fuel level being insufficient to allow the user to reach the second event location as a result of the vehicle consuming more fuel due to towing a trailer, etc.).

In yet another example, updated event information (e.g., cancelation, time change, location change, etc.) and/or updated route information (e.g., newly reported accident information, current route travel times from other user, etc.) may be utilized to identify the constraint. For example, responsive to recent route travel times reported by other users traveling along the first route being greater than a predicted route travel time utilized to generate the itinerary, the constraint on the itinerary may be identified.

At 306, the constraint may be evaluated to determine an impact on the itinerary. In an example, the impact may comprise the user arriving to an event after an event start time (e.g., arriving late), the user arriving to the event after an event end time (e.g., missing the event entirely), the user not being able to perform an activity at a first event that is critical to a second activity at a second event (e.g., the user may need to stop at a bank to get money out in order to pay for dinner at a subsequent dinner meeting), etc. For example, the user may arrive 10 minutes late to the second event in response to a traffic accident constraint causing the travel time along the first route to increase from 15 minutes to 25 minutes. The impact of the traffic accident constraint may be determined based upon, among other things, a priority level for the event associated with the impact and/or an effect of the constraint on the overall purpose of the event. In an example, responsive to the second event being a theater event with a low priority level, the impact of arriving 10 minutes late may be low (e.g., the user may only miss the previews and/or the very beginning of the movie, which may not impact the overall purpose of going to the movie). In another example, responsive to the second event being a 15-minute long business meeting with a high priority, the impact of arriving 10 minutes late may be high. In yet another example, responsive to the second event being an all-day conference with a high priority, the impact of arriving 10 minutes late may be relatively low (e.g., even though the event is important missing only a fraction of the event have a low impact).

At 308, responsive to the impact exceeding an adjustment threshold, the itinerary may be adjusted based upon the impact of the constraint. In an example, the itinerary may be adjusted by modifying a route between events, modifying an order of events within the itinerary, adding events to the itinerary, and/or removing events from the itinerary. For example, responsive to identifying a traffic accident constraint, a first route may be adjusted to avoid the traffic accident.

In an example, priority levels for events within the itinerary may be utilized to determine the adjustment to the itinerary. For example, responsive to the priority level for the first event being greater than the priority level for the second event, the itinerary may be adjusted by removing the second event from the itinerary (e.g., responsive the user experiencing a traffic constraint which is predicted to make the user late to a gym event having a low priority level and subsequently a work meeting event having a high priority level, the gym event may be removed from the itinerary to provide additional time for the user to arrive at the work meeting event).

In another example, the itinerary may be adjusted by altering an event start time, an event end time, and/or an event location. For example, a flexibility factor may be determined for events within the itinerary. Responsive to adjusting event times and/or event locations, a time deviation (e.g., the amount of time the user is early and/or late for an event) associated with the itinerary and resulting from the constraint may be reduced and/or eliminated. In an example, a grocery shopping errand event may have a medium flexibility factor in response to the location of the grocery shopping errand event being flexible. By way of example, the user may prefer to shop at a first grocery store but may also be able to shop at a second grocery store, which may be more conveniently located to a subsequent event location. Thus, the user may be able to make up for time lost due to getting a flat tire by adjusting the location of the grocery shopping errand event from the first grocery store to the second grocery store. In this way, the user may still accomplish the goal of attending the events within the itinerary in a timely fashion while maximizing efficiency.

In an example, one or more potential itinerary permutations may be generated. The potential itinerary permutations may comprise alternate sequences of events and/or alternate routes between events (e.g., itinerary permutations wherein at least one of the adjustments discussed above has been made to the itinerary). The potential itinerary permutations may be evaluated to determine whether the potential itinerary permutations may be viable options for use as the itinerary for the user (e.g., the feasibility of the user traveling from a first event location to a second event location in view of the constraint). For example, itineraries comprising alternate routes between the first event and the second event that are not impacted by the constraint and/or that are impacted to a lesser degree may be generated. In another example, responsive to not identifying an alternate route that will allow the user to arrive at the second event before the event start time and/or within an acceptable tardiness threshold, itinerary permutations, wherein the second event has been removed, may be generated.

At 310, an itinerary notification associated with the itinerary adjustment may be provided to the user and/or a second user. The itinerary notification may comprise a push notification, a text message notification, an email notification, a calendar update notification, an RSS notification, a desktop alert notification, voice notification, or an instant messenger notification. In an example, the itinerary notification may be sent to the second user to indicate that the user is running late for the event, will not make the event, will arrive on time for the event, needs to reschedule the event, and/or needs assistance (e.g., responsive to the constraint being a car accident, a notification may be sent to users attending the second event indicating the user will need to reschedule and/or the notification may be sent to an emergency assistance service indicating that the user needs assistance as a results of the accident).

In this way, the itinerary may take into account one or more constraints for a particular time period, and determine an efficient and/or effective way of achieving a user's goals (e.g., getting the user to important meetings, minimizing the negative impact of constraints, etc.).

At 312, the method 300 ends.

Figure 4A:
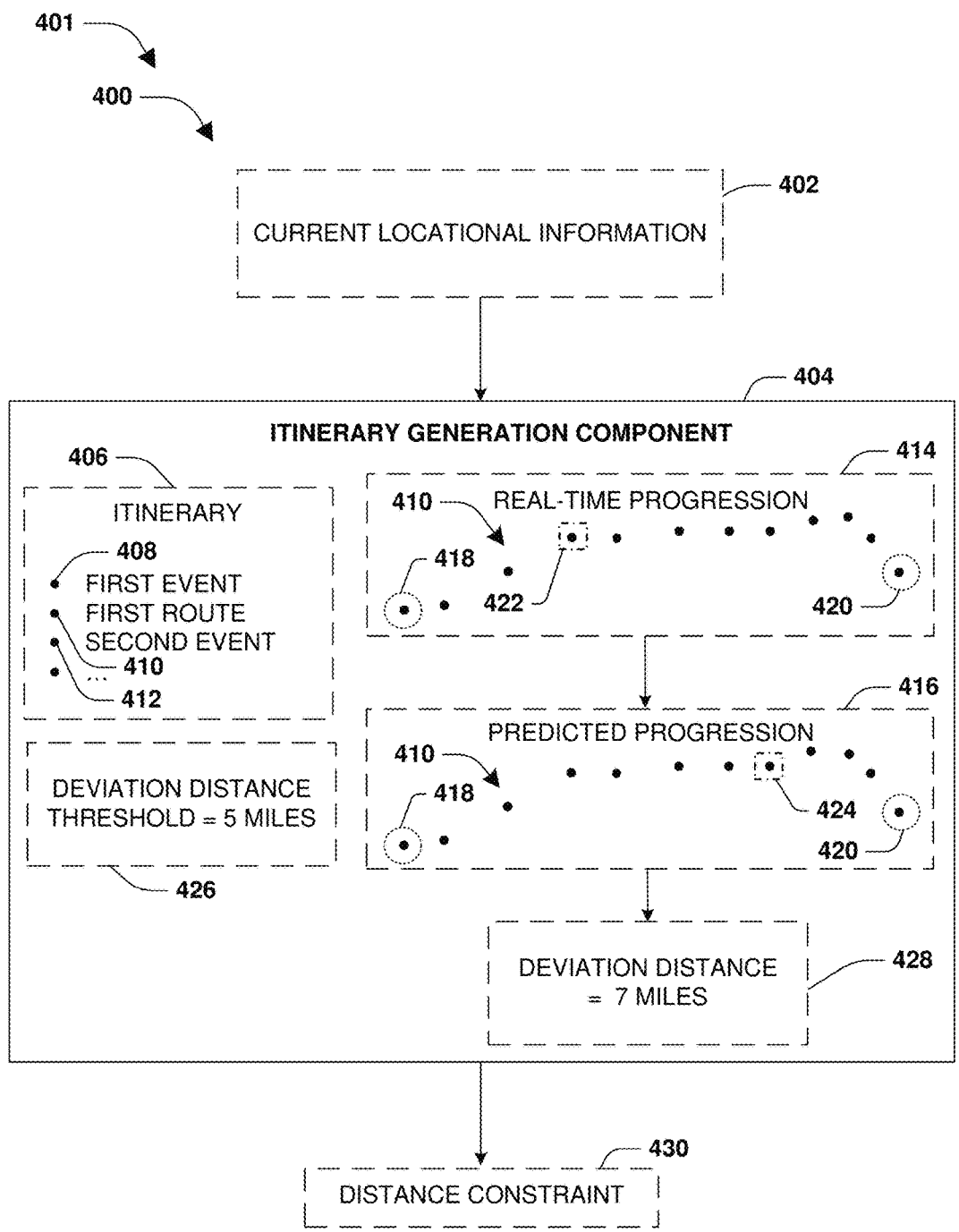
FIG. 4A is a component block diagram illustrating an exemplary system for adjusting an itinerary based upon a constraint, where the constraint is identified.
Figure 4B:
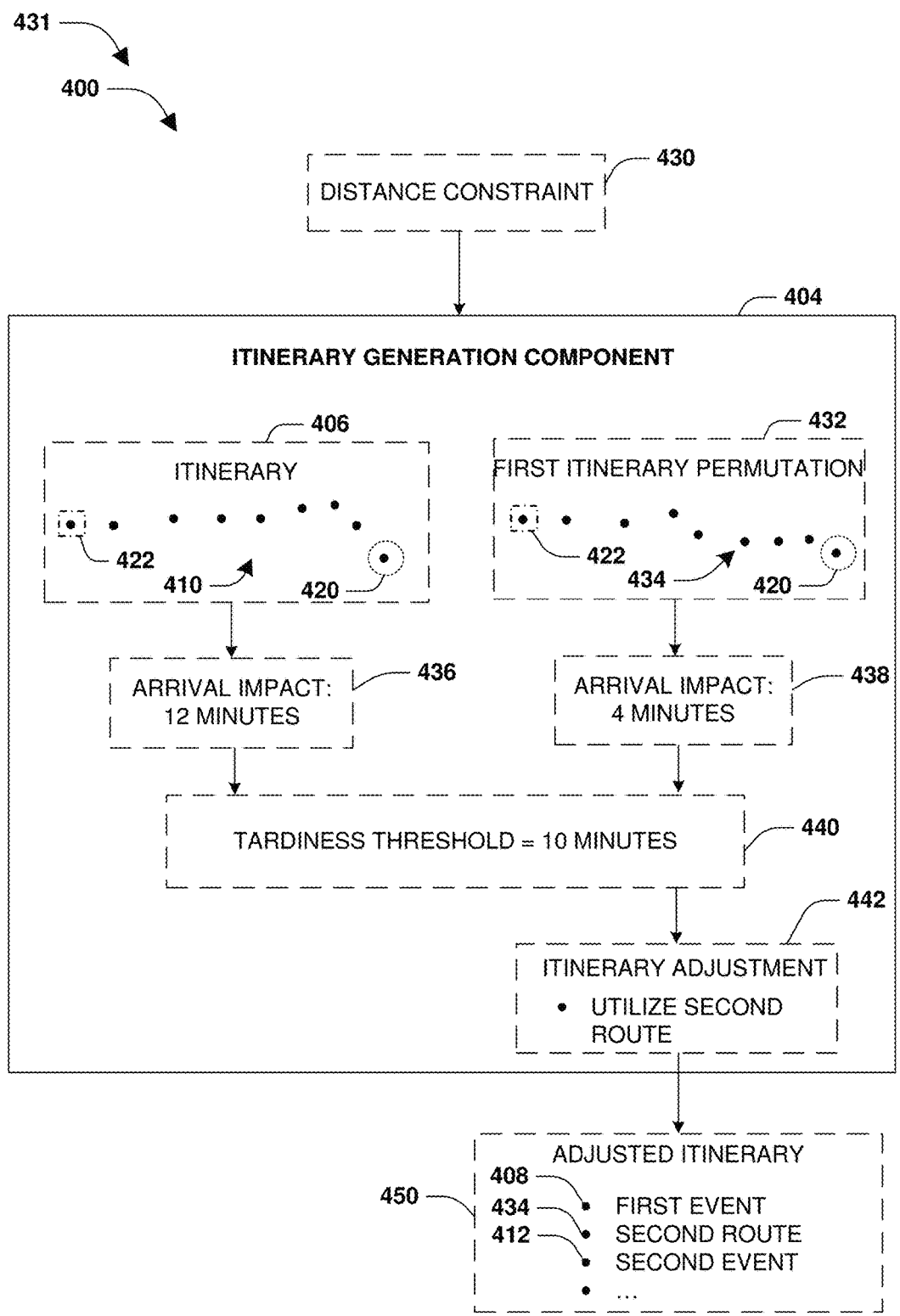
FIG. 4B is a component block diagram illustrating an exemplary system for adjusting an itinerary based upon a constraint, where an impact of the constraint is determined.

FIGS. 4A-4B illustrate examples of the system 400, wherein an itinerary generation component 404 is configured to adjust an itinerary 406 based upon a distance constraint 430. FIG. 4A illustrates an example 401 of the system 400, wherein the itinerary generation component 404 may monitor a real-time progression 414 of a user relative to the itinerary 406 to identify the constraint 406. The real-time progression 414 may be determined by the itinerary generation component 404 by evaluating locational information 402 from a GPS component of a vehicle associated with a user. The locational information 402 may be evaluated to determine a current location 422 of the user (e.g., vehicle) along a first route 410 from a first event location 418 of a first event 408 to a second event location 420 of a second event 412. The real-time progression 414 of the user may be compared to a predicted progression 416 of the user according to the itinerary 406 and a current time. For example, the current location 422 of the user may be compared to a predicted location 424 of the user to determine a deviation distance 428 of 7 miles. Responsive to the deviation distance 428 exceeding a deviation distance threshold 426 of 5 miles, the distance constraint 430 may be identified for the itinerary 406.

FIG. 4B illustrates an example 431, wherein the itinerary generation component 404 may be configured to adjust the itinerary 406 based upon an arrival impact of the distance constraint 430. In an example, a first arrival impact 436 may be determined for the itinerary 406 in response to the distance constraint 430. The first arrival impact 436 may be indicative of the user arriving 12 minutes late to the second event 412 (e.g., an updated predicted travel time may be determined from the current location 422 of the user to the second event location 420 along the remainder of the first route 410). Responsive to a tardiness threshold being 10 minutes (e.g., the first arrival impact 436 of 12 minutes exceeding the tardiness threshold of 10 minutes), the itinerary 406 may be determined to not be a viable itinerary option for the user. Responsive to the itinerary 406 not being a viable itinerary option, a first itinerary permutation 432 comprising a second route 434 from the current location 422 of the user to the second event location 420 may be generated. The first itinerary permutation 432 may be evaluated to determine an arrival impact 438 of the distance constraint 430 on the first itinerary permutation 432. The second arrival impact 438 may be determined to be 4 minutes based upon the second route 434 having a shorter route distance and/or allowing for a faster rate of travel (e.g., having a higher speed limit). Responsive to the tardiness threshold being 10 minutes (e.g., the second arrival impact 438 of 4 minutes not exceeding the tardiness threshold of 10 minutes), the first itinerary permutation 432 may be determined to be a viable itinerary option for the user. Accordingly, an itinerary adjustment 442, indicative of utilizing the second route 434 to travel from the current location 422 of the user to the second event location 420, may be made to the itinerary 406 to generate an adjusted itinerary 450 comprising the second route 434.

Figure 5:
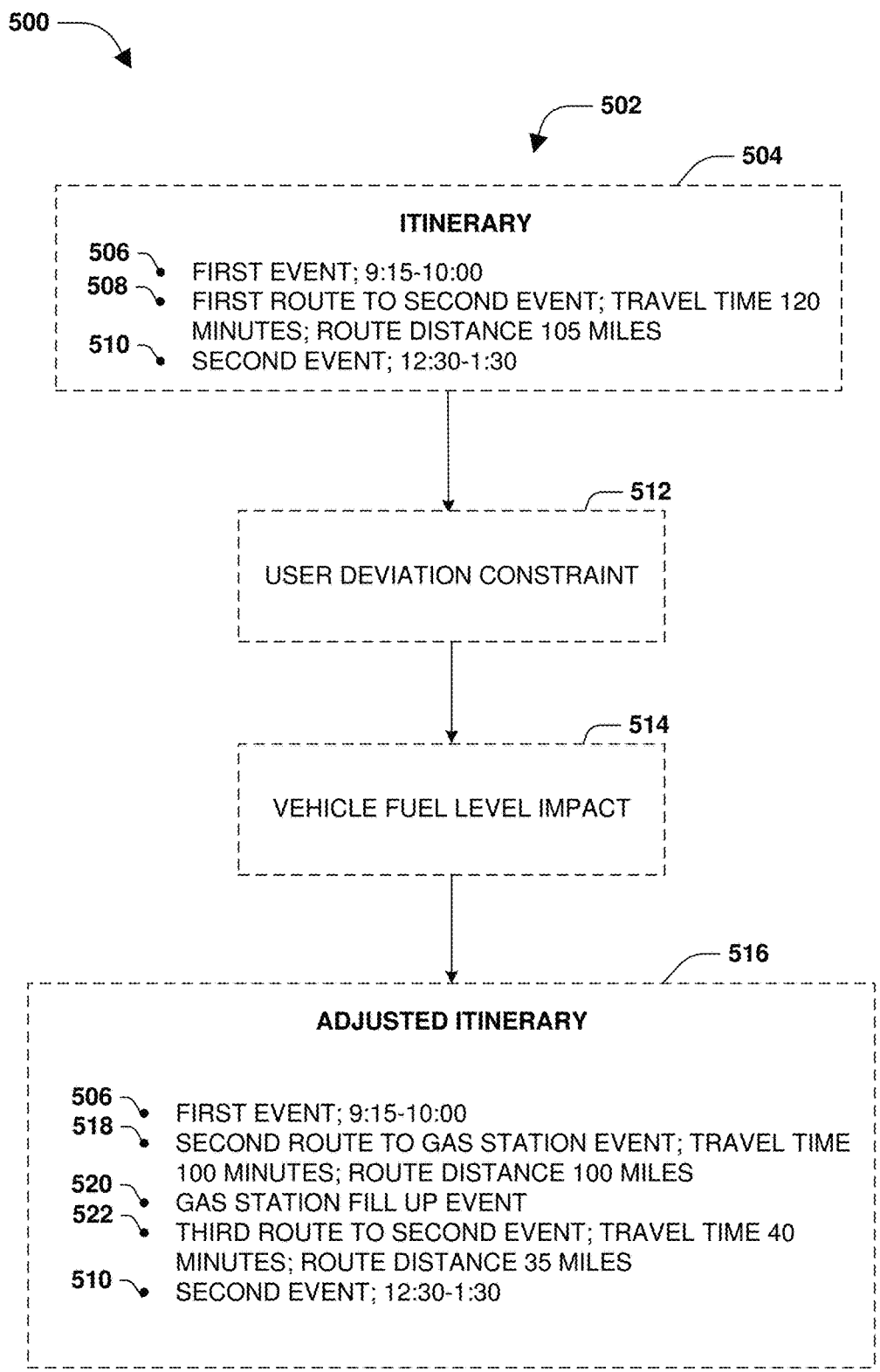
FIG. 5 is a component block diagram illustrating an exemplary system for adjusting an itinerary based upon a constraint, where an event is added to the itinerary based upon a user deviation constraint.

FIG. 5 illustrates an example of the system 500, wherein an itinerary generation component 502 is configured to adjust an itinerary 504 based a user deviation constraint 512. The itinerary 504 may be indicative of the user traveling from a first event 506 to a second event 510 along a first route 508. In an example, the user may deviate from the itinerary 504 by choosing to take a different route and/or by getting lost. Responsive to the user deviating from the first route 508, the itinerary generation component 502 may identify a user deviation constraint 512. The user deviation constraint 512 may be evaluated by the itinerary generation component 502 to determine an impact of the user deviation constraint 512 on the itinerary 504. For example, a vehicle fuel level impact 514 may be determined based upon a change in the route and/or a change in the route distance between the first event 506 and the second event 510. Responsive to the vehicle fuel impact 514 being indicative of the user not having enough fuel to reach the second event 510, the itinerary generation component 502 may be configured to adjust the itinerary 504 to generate an adjusted itinerary 516. The itinerary 504 may be adjusted by adding a gas station fill up event 520. A second route 518 between the current location of the user and the gas station fill up event 520 and a third route 522 between the gas station fill up event 520 and the second event location 510 may also be added to the itinerary 516 to generate the adjusted itinerary 516. In this way, vehicle conditions and/or user deviations from the itinerary may be evaluated to determine an impact thereof on the itinerary and, if necessary, accounted for by the itinerary generation component by adjusting the itinerary. Accordingly, a user's experience with an itinerary, generated by the itinerary generation component, as well as an efficiency with which the user progresses through tasks may be improved.

Figure 6:
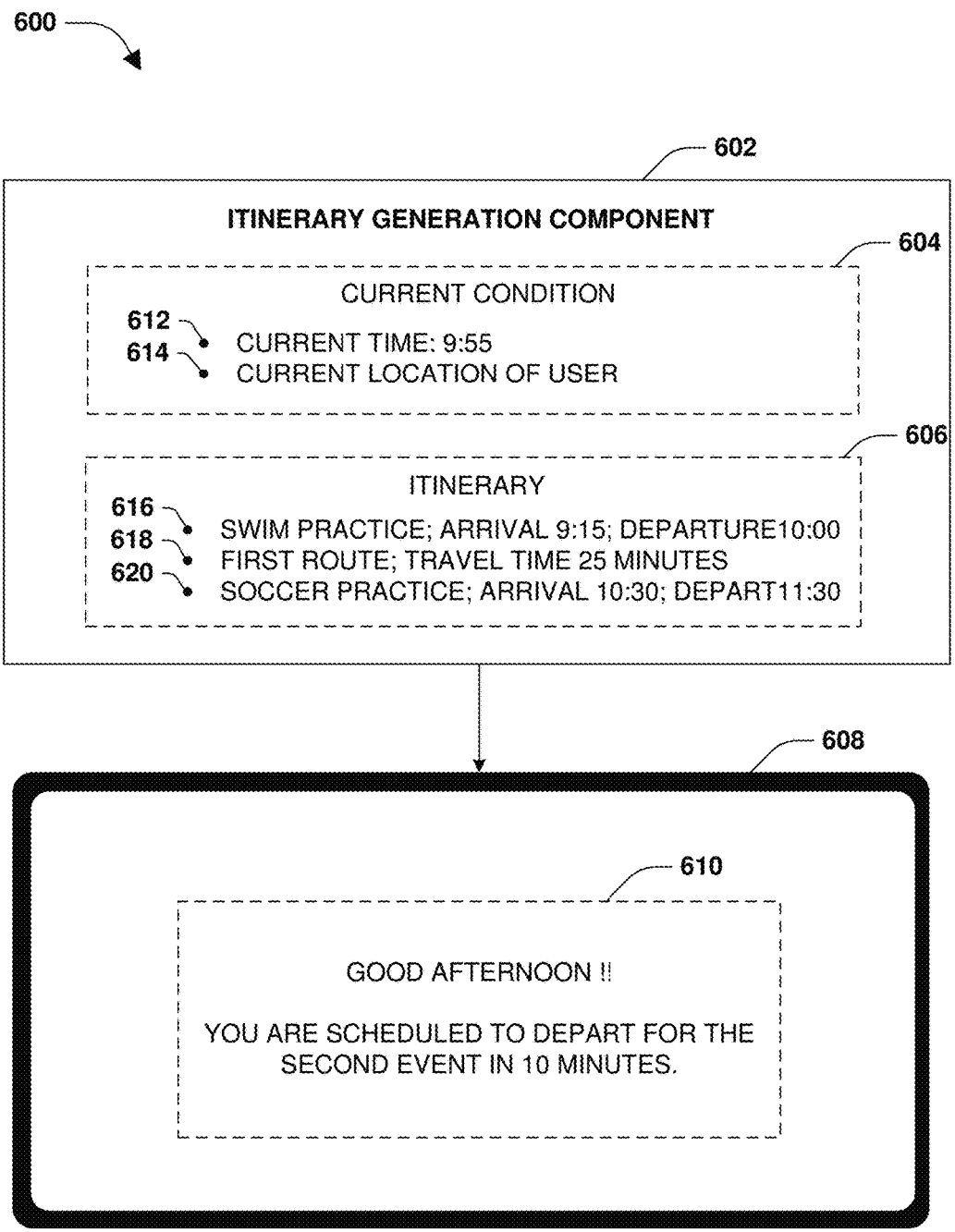
FIG. 6 is a component block diagram illustrating an exemplary system for adjusting an itinerary based upon a constraint, where a notification is provided to the user.

FIG. 6 illustrates an example of a system 600, comprising an itinerary generation component 602, configured to preemptively provide a user, through a user device 608, with a notification 610 for an upcoming event, such as a departure from a swimming practice event 616. The itinerary generation component 602 may identify a current condition 604, such as a current time 612 and/or current location 614 of the user. The itinerary generation component 602 may evaluate an itinerary 606 using the current condition 604 to determine that the user should leave in 10 minutes in order to arrive at a soccer practice event 620 on time. The itinerary generation component 602 may display the notification 610 on the user device 608 as an email, a text message, a mobile alert, an audio message alert, a video, etc. The notification 610 may provide an option to populate a user interface with directions to the soccer practice event 620 and/or send a text message to team members notifying them that the user is on the way to the soccer practice event 620. In this way, the user may be preemptively notified of upcoming events so that the user will not forget the events and/or deviate from the itinerary.

Figure 7:
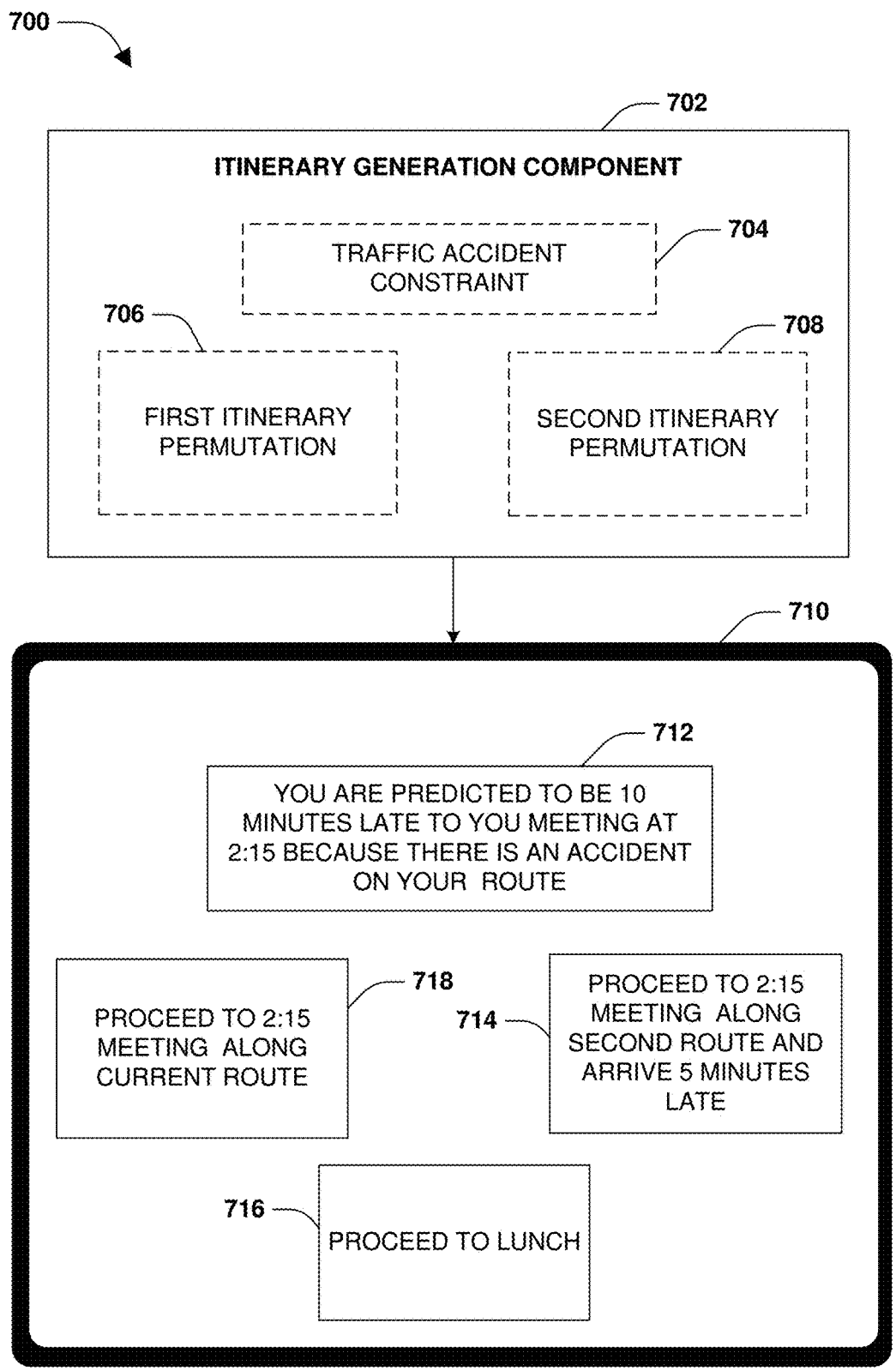
FIG. 7 is a component block diagram illustrating an exemplary system for adjusting an itinerary based upon a constraint, where user feedback is provided.

FIG. 7 illustrates an example a system 700, comprising an itinerary generation component 702, configured to receive feedback, through a user device 710, in response to providing a user with a notification 712 of a traffic accident constraint 704. Responsive to the itinerary generation component 702 identifying the traffic accident constraint 704, a first itinerary permutation 706 and a second itinerary permutation 708 may be identified. The itinerary generation component 702 may display the notification 712 on the user device 710. The notification 712 may comprise a first adjustment option 714 associated with the first itinerary permutation 706, a second adjustment option 716 associated with the second itinerary permutation 708, and/or a non-adjustment option 718. The options 714-718 may include information regarding the impact of selecting each of the options 714-718. Responsive to the user selecting the first adjustment option 714 or the second adjustment option 716, the first itinerary permutation 706 or the second itinerary permutation 708 may be utilized to adjust the itinerary (not illustrated). In this way, the user may provide feedback for the adjustment of the itinerary based upon a select (e.g., preferred) number of adjustment options.

Figure 8:
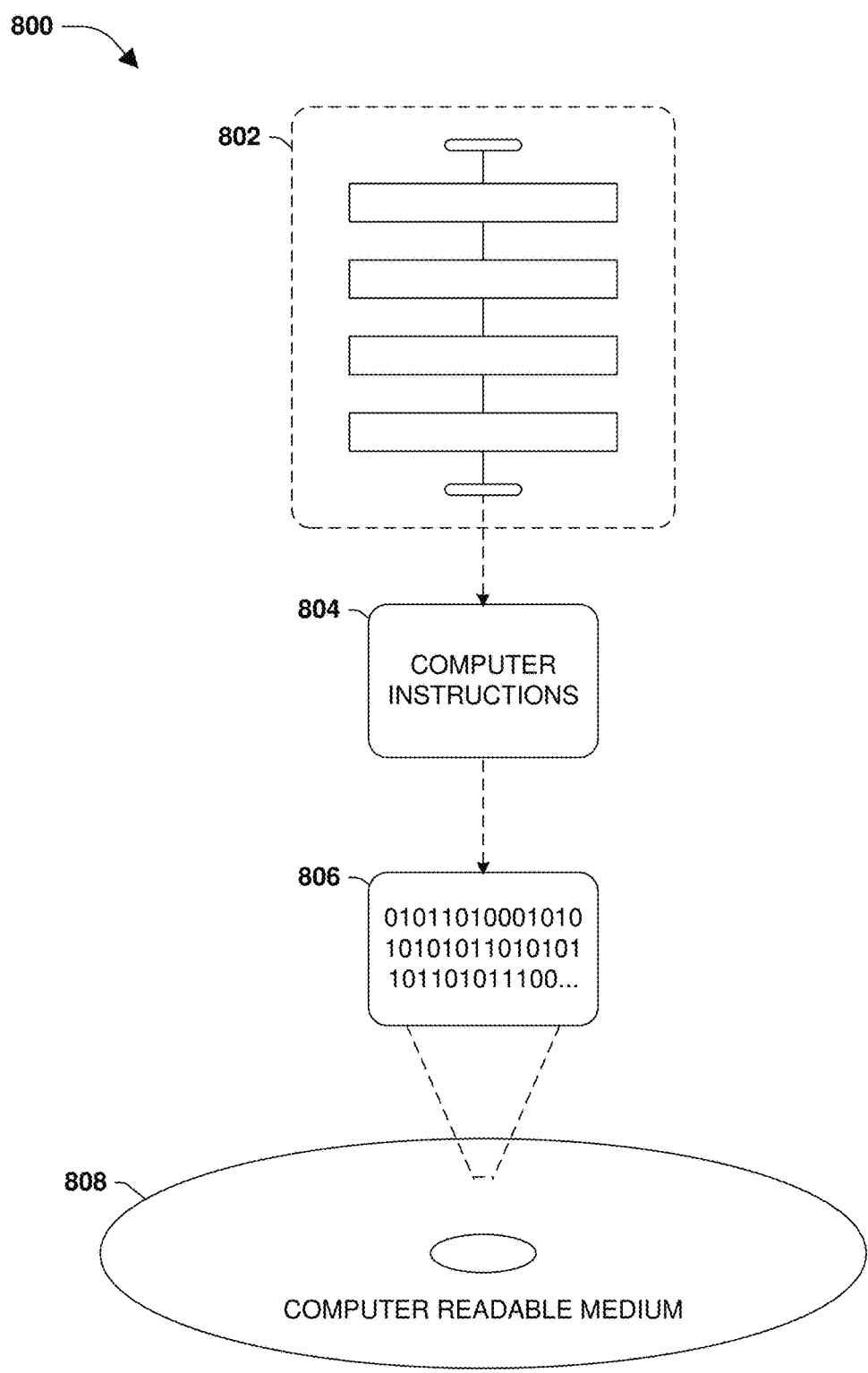
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the set of computer instructions 804 are configured to perform a method 802, such as at least some of the exemplary method 100 of FIG. 1, and/or at least some of the exemplary method 300 of FIG. 3, for example. In some embodiments, the set of computer instructions 804 are configured to implement a system, such as at least some of the exemplary system 200 of FIGS. 2A-2B, at least some of the exemplary system 400 of FIGS. 4A-4B, at least some of the exemplary system 500 of FIG. 5, at least some of the exemplary system 600 of FIG. 6, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
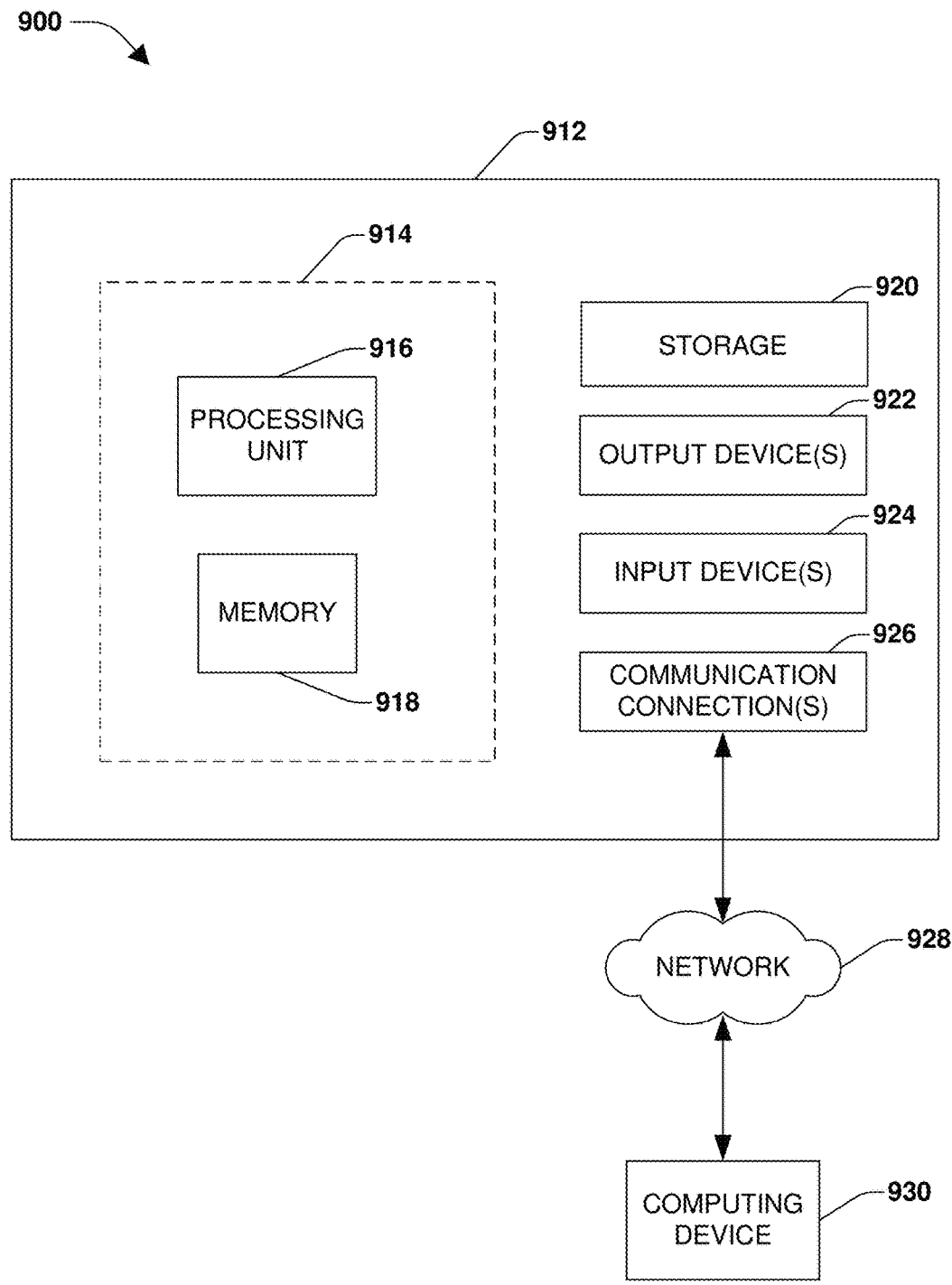
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example), or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Computer storage media does not, however, include propagated signals. Rather, computer storage media excludes propagated signals. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of routing a user between events using an itinerary, comprising:
    assessing an event source to identify event information for events associated with a user;
    evaluating the event information to determine a schedule of events;
    identifying routes between events within the schedule of events to determine route information for the routes;
    evaluating the event information for the events within the schedule of events and the route information for the routes between the events in the schedule of events to generate an itinerary of events;
    identifying a constraint on the itinerary;
    evaluating, via a processor, the constraint to determine an impact of the constraint on the itinerary based upon a combination of:
        a priority level of an event associated with the impact; and
        an effect that a late arrival to the event predicted in association with the constraint is determined to have on an overall purpose of the event;
    responsive to the impact exceeding an adjustment threshold, adjusting the itinerary to create an adjusted itinerary; and
    routing the user between the events within the schedule of events using the adjusted itinerary of events.

2. The method of claim 1, the late arrival corresponding to an amount of time by which the user is predicted to arrive late to the event in association with the constraint.

3. The method of claim 1, the adjusting the itinerary comprising at least one of:
    modifying a route between one or more events;
    modifying an order of one or more events within the schedule of events;
    adding a second event to the itinerary; or
    removing the event from the itinerary.

4. The method of claim 1, the evaluating the constraint comprising:
    responsive to determining that the priority level of the event is a first priority level and that the late arrival to the event, by a first amount of time, is determined to have a first effect on the overall purpose of the event, determining that the impact of the constraint is a first impact; and
    responsive to determining that the priority level of the event is a second priority level and that the late arrival to the event, by the first amount of time, is determined to have a second effect on the overall purpose of the event, determining that the impact of the constraint is a second impact,
    wherein the second priority level is higher than the first priority level, the second effect is greater than the first effect, and the second impact is greater than the first impact.

5. The method of claim 1, the evaluating the constraint comprising:
    responsive to determining that the priority level of the event is a first priority level and that the late arrival to the event, by a first amount of time, is determined to have a first effect on the overall purpose of the event, determining that the impact of the constraint is a first impact; and
    responsive to determining that the priority level of the event is the first priority level and that the late arrival to the event, by the first amount of time, is determined to have a second effect on the overall purpose of the event, determining that the impact of the constraint is a second impact,
    wherein a second proportion is less than a first proportion, and the second impact is less than the first impact.

6. The method of claim 1, the events comprising a first event and a second event, and the evaluating the event information for the events within the schedule of events comprising:
    identifying a time window between an end time for the first event and a start time for the second event;
    determining predicted travel times for routes between the first event and the second event; and
    evaluating the predicted travel times and the time window to determine whether to include at least one of the first event or the second event in the itinerary.

7. The method of claim 6, the evaluating the predicted travel times and the time window comprising:
    responsive to the predicted travel times for the routes between the first event and the second event exceeding the time window, determining not to include at least one of the first event or the second event in the itinerary; and
    responsive to at least one of the predicted travel times for the routes between the first event and the second event not exceeding the time window, determining to include the first event and the second event in the itinerary.

8. The method of claim 6, the routes between the first event and the second event comprising a first route having a first predicted travel time and a second route having a second predicted travel time, and the method comprising:
    responsive to the first predicted travel time and the second predicted travel time not exceeding the time window, evaluating at least one of a set of saved trips from a trip library or a user input to determine a route preference for the first route or the second route; and
    responsive to determining the route preference for the first route, selecting the first route but not the second route based upon the route preference for the first route.

9. The method of claim 6, comprising:
    responsive to determining not to include at least one of the first event or the second event in the itinerary, identifying a first priority level for the first event and a second priority level for the second event; and
    responsive to the first priority level for the first event being greater than the second priority level for the second event, including the first event but not the second event in the itinerary.

10. The method of claim 6, the determining predicted travel times comprising:
    evaluating at least one of route distances, route speed limits, vehicle types, vehicle conditions, weather conditions, road restrictions, current traffic data, historical trip data, or historical traffic data for the routes between the first event and the second event to determine the predicted travel times for the routes between the first event and the second event.

11. The method of claim 1, the event source comprising at least one of a digital calendar, a learned behavior database, a trip library, a social network, an email system, a message board, a blog, an event scheduling application, or a notification interface associated with the user, and the event information comprising at least one of an event start time, an event end time, an event priority, or an event location.

12. The method of claim 1, the assessing an event source to identify event information for events comprising:
evaluating a content item within an event source to identify a first event; and
utilizing a recognition analysis model to identify event information for the first event.

13. The method of claim 1, the event source comprising a first event source and a second event source, and the assessing an event source to identify event information for events comprising:
utilizing a first recognition analysis model to evaluate a first content item within the first event source to identify event information for a first event; and
utilizing a second recognition analysis model to evaluate a second content item within the second event source to identify event information for the second event, wherein the first content item is a first type of content item and the second content item is a second type of content item, the first type of content item different than the second type of content item.

14. The method of claim 1, the evaluating the event information for the events within the schedule of events comprising:
responsive to identifying a conflict between one or more events, evaluating a plurality of potential itinerary permutations to determine trip weights associated with the plurality of potential itinerary permutations; and
responsive to a first trip weight for a first potential itinerary permutation being greater than a second trip weight for a second potential itinerary permutation, presenting the first potential itinerary permutation to the user as the itinerary.

15. A system for adjusting an itinerary, comprising:
a processor; and
memory comprising processor-executable instructions that when executed by the processor cause implementation of an itinerary generation component configured to:
identify a constraint on an itinerary;
evaluate the constraint to determine an impact of the constraint on the itinerary based upon a combination of:
a priority level of an event associated with the impact; and
a proportion of the event that is predicted to be missed as a result of a late arrival to the event predicted in association with the constraint;
responsive to the impact exceeding an adjustment threshold, adjust the itinerary to create an adjusted itinerary; and
route a user between events using the adjusted itinerary.

16. The system of claim 15, the evaluating comprising:
responsive to determining that the priority level of the event is a first priority level and that the proportion of the event that is predicted to be missed as a result of the late arrival to the event, by a first amount of time, is a first proportion of the event, determining that the impact of the constraint is a first impact; and
responsive to determining that the priority level of the event is a second priority level and that the proportion of the event that is predicted to be missed as a result of the late arrival to the event, by the first amount of time, is a second proportion of the event, determining that the impact of the constraint is a second impact,
wherein the second priority level is higher than the first priority level, the second proportion is greater than the first proportion, and the second impact is greater than the first impact.

17. A non-transitory computer readable medium comprising instructions which when executed perform a method for adjusting an itinerary, comprising:
assessing an event source to identify event information for events associated with a user;
evaluating the event information to determine a schedule of events;
identifying routes between events within the schedule of events to determine route information for the routes;
evaluating the event information for the events within the schedule of events and the route information for the routes between the events in the schedule of events to generate an itinerary of events;
monitoring at least one of locational information or vehicle information to identify a constraint on the itinerary;
evaluating, via a processor, the constraint to determine an impact of the constraint on the itinerary based upon at least one of:
a priority level of an event associated with the impact; or
a late arrival to the event predicted in association with the constraint;
responsive to the impact exceeding an adjustment threshold, adjusting the itinerary to create an adjusted itinerary; and
routing the user between events using the adjusted itinerary.

18. The system of claim 15, the evaluating comprising:
responsive to determining that the priority level of the event is a first priority level and that the proportion of the event that is predicted to be missed as a result of the late arrival to the event, by a first amount of time, is a first proportion of the event, determining that the impact of the constraint is a first impact; and
responsive to determining that the priority level of the event is the first priority level and that the proportion of the event that is predicted to be missed as a result of the late arrival to the event, by the first amount of time, is a second proportion of the event, determining that the impact of the constraint is a second impact,
wherein the second proportion is less than the first proportion, and the second impact is less than the first impact.

19. The non-transitory computer readable medium of claim 17, the impact determined based upon the late arrival to the event predicted in association with the constraint, the evaluating the constraint comprising:
responsive to determining that the late arrival to the event, by a first amount of time, is predicted to result in missing a first proportion of the event, determining that the impact of the constraint is a first impact; and
responsive to determining that the late arrival to the event, by the first amount of time, is predicted to result in missing a second proportion of the event, determining that the impact of the constraint is a second impact,
wherein the second proportion is less than the first proportion, and the second impact is less than the first impact.

20. The non-transitory computer readable medium of claim 17, the impact determined based upon the priority level of the event associated with the impact, the evaluating the constraint comprising:

responsive to determining that the priority level of the event is a first priority level, determining that the impact of the constraint is a first impact; and responsive to determining that the priority level of the event is a second priority level, determining that the impact of the constraint is a second impact, wherein the second priority level is higher than the first priority level, and the second impact is greater than the first impact.

* * * * *